US012671051B2

(12) United States Patent
Greenland et al.

(10) Patent No.: US 12,671,051 B2
(45) Date of Patent: Jun. 30, 2026

(54) PLANAR FILAMENT WITH FOCUSED, CENTRAL ELECTRON EMISSION

(71) Applicant: Moxtek, Inc., Orem, UT (US)

(72) Inventors: Kasey Otho Greenland, South Jordan, UT (US); Todd S. Parker, Kaysville, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 19/244,080

(22) Filed: Jun. 20, 2025

(65) Prior Publication Data

US 2025/0316436 A1 Oct. 9, 2025

Related U.S. Application Data

(63) Continuation of application No. 18/333,112, filed on Jun. 12, 2023, now Pat. No. 12,374,518.

(60) Provisional application No. 63/388,306, filed on Jul. 12, 2022.

(51) Int. Cl.
*H01J 35/06* (2006.01)

(52) U.S. Cl.
CPC .................................. *H01J 35/064* (2019.05)

(58) Field of Classification Search
CPC ..................................................... H01J 35/064
See application file for complete search history.

(56) References Cited

U.S. PATENT DOCUMENTS

| | | | | |
|---|---|---|---|---|
| 8,247,971 | B1 | 8/2012 | Bard et al. | |
| 2005/0232396 | A1* | 10/2005 | Chidester | H01J 35/066 378/136 |
| 2007/0246789 | A1 | 10/2007 | Freudenberger et al. | |
| 2010/0239828 | A1 | 9/2010 | Cornaby et al. | |
| 2012/0212157 | A1* | 8/2012 | Cornaby | H01K 1/14 313/310 |
| 2022/0254594 | A1 | 8/2022 | Miller | |

* cited by examiner

*Primary Examiner* — Chih-Cheng Kao
(74) *Attorney, Agent, or Firm* — Thorpe North & Western, LLP.

(57) ABSTRACT

A planar filament for an x-ray tube can have a different cross-sectional area at different locations. In regions of smaller cross-sectional area, there can be higher current density, and thus increased heating and higher temperature of the wire. In regions of larger cross-sectional area, there can be lower current density, and thus decreased heating of the wire. Regions of larger cross-sectional area can also be stronger, thus reducing early filament failures. Wider regions can have increased area for electron emission. By adjusting the cross-sectional area and width of the wire at different locations, electron emission can be largely confined to a center of the filament, and filament life can increase.

20 Claims, 5 Drawing Sheets

PLANAR FILAMENT WITH FOCUSED, CENTRAL ELECTRON EMISSION

CLAIM OF PRIORITY

This is a continuation of U.S. patent application Ser. No. 18/333,112, filed Jun. 12, 2023; which claims priority to US Provisional Patent Application Number U.S. 63/388,306, filed on Jul. 12, 2022, which are incorporated herein by reference.

FIELD OF THE INVENTION

The present application is related to x-ray sources.

BACKGROUND

X-rays have many uses, including imaging, x-ray fluorescence analysis, x-ray diffraction analysis, and electrostatic dissipation. A large voltage between a cathode and an anode of the x-ray tube, and sometimes a heated filament, can cause electrons to emit from the cathode to the anode. The anode can include a target material. The target material can generate x-rays in response to impinging electrons from the cathode.

BRIEF DESCRIPTION OF THE DRAWINGS (DRAWINGS MIGHT NOT BE DRAWN TO SCALE)

FIG. 1 is a top-view of a filament 10 with a wire including a pair of outer-high-regions 11, a pair of low-regions 12, a pair of central-high-regions 13, and a center-region 14. These regions can have different widths relative to each other (W12>W11, W12>W13, W14>W13).

FIG. 2 is a top-view of a filament 20 with a wire including a pair of outer-high-regions 11, a pair of low-regions 12, and a central-high-region 13. These regions can have different thicknesses and/or widths relative to each other.

FIG. 3 is a cross-sectional side-view of a filament 30 with a pair of outer-high-regions 11 and a low-region 12. These regions can have different thicknesses and/or widths relative to each other.

FIG. 4 is a cross-sectional side-view of a filament 40 with a pair of outer-high-regions 11 and a low-region 12. These regions can have different thicknesses and/or widths relative to each other.

FIG. 5 is a cross-sectional side-view of a filament 50 with a pair of outer-high-regions 11, a pair of low-regions 12, and a central-high-region 13. These regions can have different thicknesses and/or widths relative to each other.

FIG. 6 is a cross-sectional side-view of a filament 60 with a wire including a pair of outer-high-regions 11, a pair of low-regions 12, a pair of central-high-regions 13, and a center-region 14. These regions can have different thicknesses and/or widths relative to each other.

FIG. 7 is a cross-sectional side-view of a filament 70 with a thin-region 72 electrically-coupled between a pair of thick-regions 71. The thin-region 72 can be thinner than the pair of thick-regions 71.

FIG. 8 is a cross-sectional side-view of a filament 80 with a thin-region 72 electrically-coupled between a pair of thick-regions 71. A width W72 of the thin-region 72 can be greater than a width W71 of the pair of thick-regions 71. The thin-region 72 can be thinner than the pair of thick-regions 71.

Figure 14:
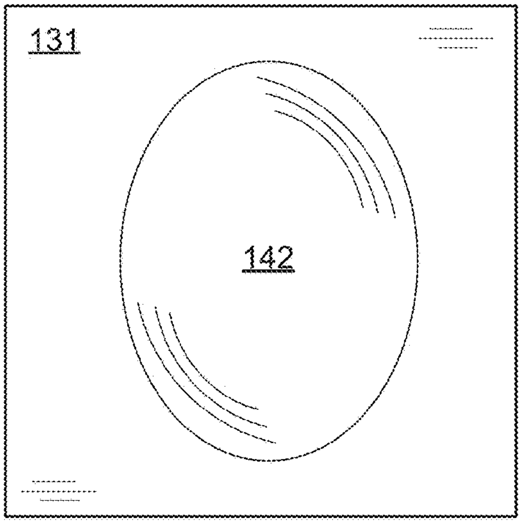

FIG. 14 is a top-view illustrating a step in a method of making a spiral filament with multiple thicknesses, including applying a mask 142 on a desired thicker region of a sheet of metal 141, then etching outside of the mask 142, to form the multiple, different thicknesses.

Figure 15:
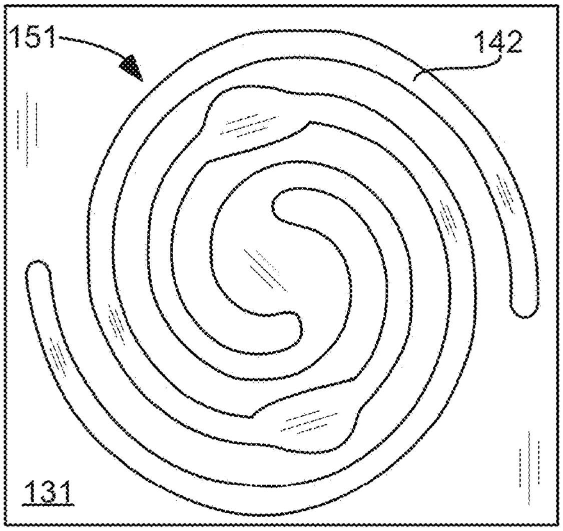

FIG. 15 is a top-view illustrating a step in a method of making a spiral filament, including applying a mask 142 on a planned location, of the elongated shape 151 of the spiral filament, on a sheet of metal 141 with multiple, different thicknesses Th, then etching outside of the mask 142 to form the elongated shape 151.

Figure 16:
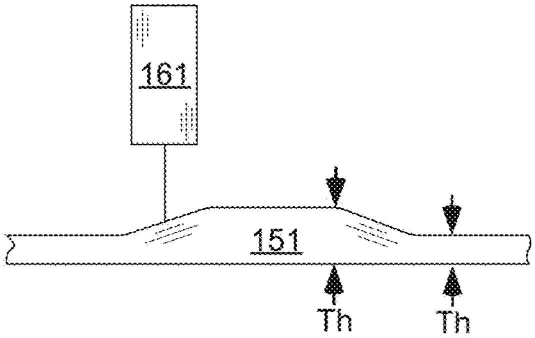

FIG. 16 is a side-view illustrating a step in a method of making a spiral filament, including using a laser 161 to cut an elongated shape 151 of the spiral filament.

Figure 17:
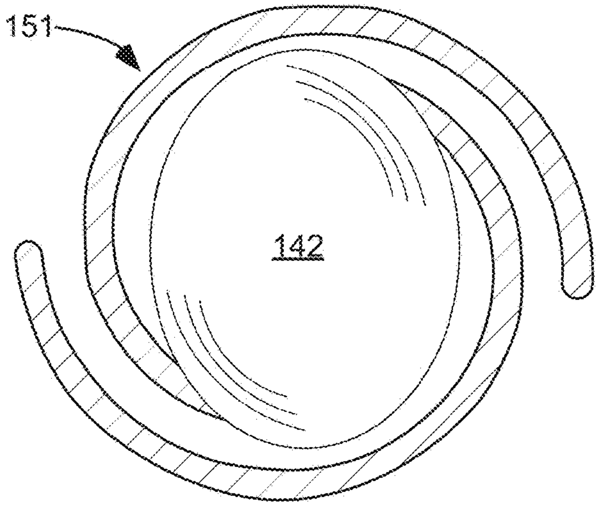

FIG. 17 is a top-view illustrating a step in a method of making a spiral filament, including applying a mask 142 on a planned thicker region of the elongated shape 151, then etching outside of the mask 142, to form the multiple, different thicknesses of the elongated shape 151.

REFERENCE NUMBERS IN THE DRAWINGS filament 10, 20, 30, 40, 50, 60, 70, 80, 90
outer-high-region 11
low-region 12
central-high-region 13
center-region 14
electrode 15
axis 16
plane 31
thick-region 71
thin-region 72
transmission-target x-ray tube 100, 110
cathode 101
filament 101F
anode 102
x-ray window 103
target 104
electrically-insulative enclosure 105
side-window, reflection-target x-ray tube 120
sheet of metal 131 with multiple, different thicknesses Th
a plane 132 of a face of the sheet of metal 131 with multiple, different thicknesses Th
sheet of metal 141
mask 142
elongated shape 151
laser 161
transition height H
transition length L
thickness T11 of the wire in the outer-high-region 11
thickness T12 of the wire in the low-region 12
thickness T13 of the wire in the central-high-region 13
thickness T14 of the wire in the center-region 14 thickness T71 of the wire in the thick-region 71
thickness T72 of the wire in the thin-region 72
width W11 of the wire in the outer-high-region 11
width W12 of the wire in the low-region 12
width W13 of the wire in the central-high-region 13
width W14 of the wire in the center-region 14
width W71 of the wire in the thick-region 71
width W72 of the wire in the thin-region 72

Definitions

The following definitions, including plurals of the same, apply throughout this patent application.

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "same cross-sectional area" means exactly the same wire cross-sectional area; the same wire cross-sectional area within normal manufacturing tolerances; or almost exactly the same wire cross-sectional area, such that any deviation from exactly the same wire cross-sectional area would have negligible effect for ordinary use of the device.

As used herein, the term "same thickness" means exactly the same thickness; the same thickness within normal manufacturing tolerances; or almost exactly the same thickness, such that any deviation from exactly the same thickness would have negligible effect for ordinary use of the device.

As used herein, the term "same width" means exactly the same width; the same width within normal manufacturing tolerances; or almost exactly the same width, such that any deviation from exactly the same width would have negligible effect for ordinary use of the device.

As used herein, the term "x-ray tube" is not limited to tubular/cylindrical shaped devices. The term "tube" is used because this is the standard term used for x-ray emitting devices.

In comparison of thicknesses, if the region has multiple thicknesses, then the largest thickness in the region is used for the comparison. In comparison of widths, if the region has multiple widths, then the largest width in the region is used for the comparison.

DETAILED DESCRIPTION

There are advantages to having a different filament cross-sectional area at different locations, including (a) focused and increased emission of electrons from a center of the filament, (b) increased rate of filament temperature rise, and (c) stabilization of vulnerable locations of the filament.

In regions of smaller cross-sectional area, there can be higher current density, and thus increased heating of the wire. In regions of larger cross-sectional area, there can be lower current density, and thus decreased heating of the wire. This increased and decreased heating affects overall wire temperature. By adjusting the cross-sectional area of the wire at different locations, electron emission can be largely confined to preferential region(s), such as a center of the filament. For example, ≥50% or ≥90% of electrons can be emitted from a central 25% of the filament.

A center-region 14 of the filament can be wider, to increase area for electron emission. The center-region 14 can also be thinner, to increase current density and heating at the center. Thus, a wider and thinner center-region 14 of the filament can work together to increase electron emission from this center-region 14. This wider and thinner center-region 14 can also increase the rate of temperature rise in the filament, allowing more rapid pulses of electron emission. The center-region 14 of the filament can be wider, thinner, or both than any other part of the filament.

Typically, a filament has a higher temperature at its center-region 14. As a result of this higher temperature, grain structure can be different at the center-region than at outer ends. The filament can prematurely cleave at a transition between these locations of different grain structure. It can be beneficial to strengthen this location by increasing the filament's cross-sectional area at such location. An area of the filament with increased cross-sectional area can have more grains and more grain boundaries, and thus can be stronger.

Figure 1:
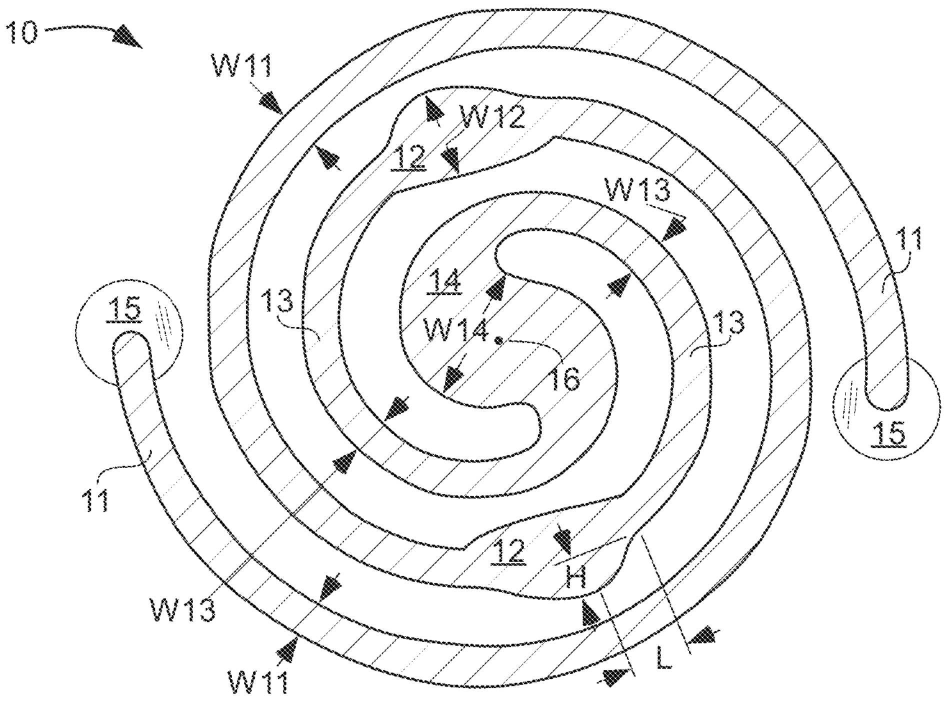
Figure 2:
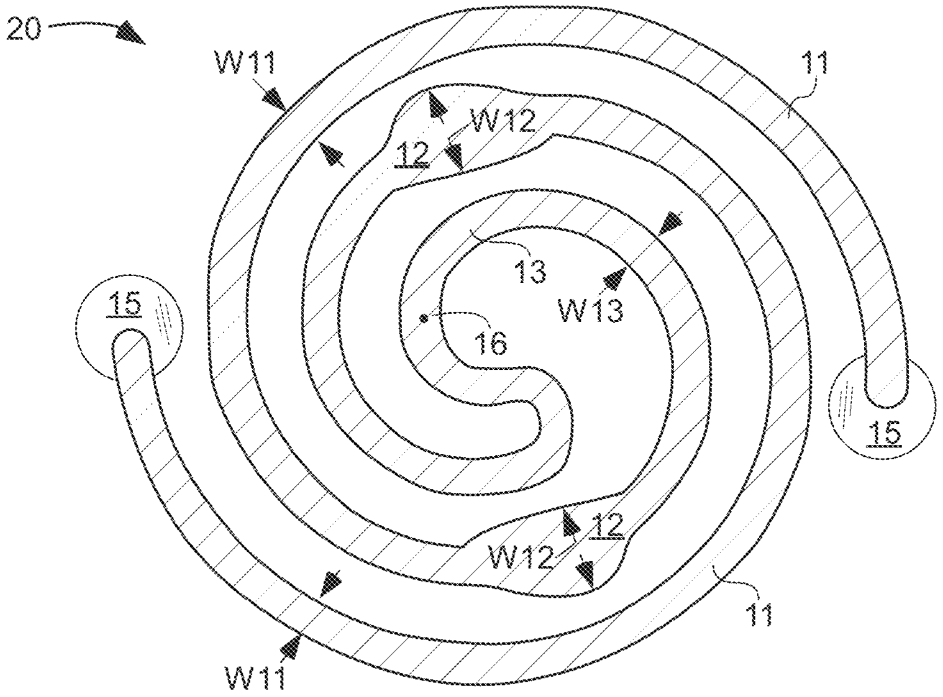
Figure 10:
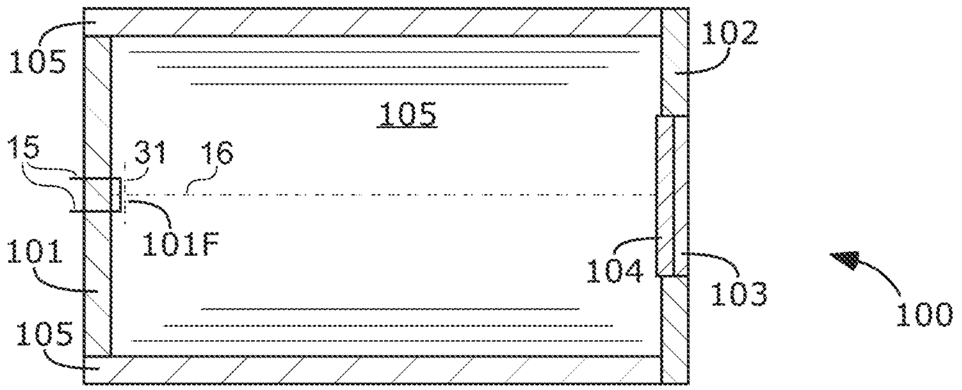
FIG. 10 is a cross-sectional side-view of a transmission-target x-ray tube 100 with a filament 101F as described herein.
Figure 11:
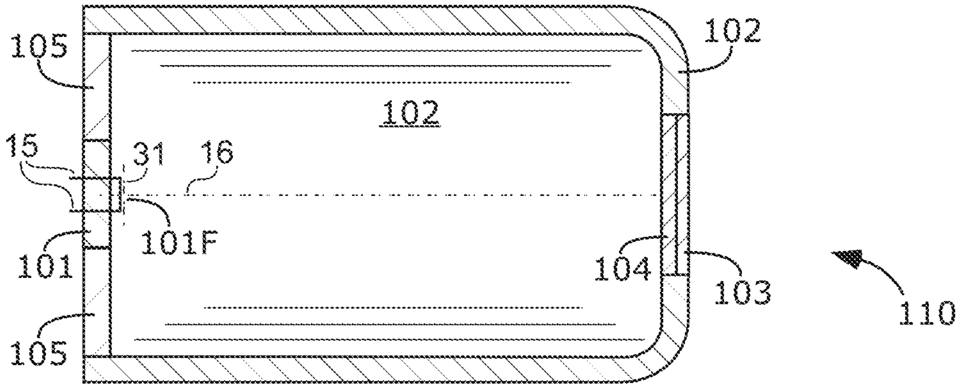
FIG. 11 is a cross-sectional side-view of a transmission-target x-ray tube 110 with a filament 101F as described herein.
Figure 12:
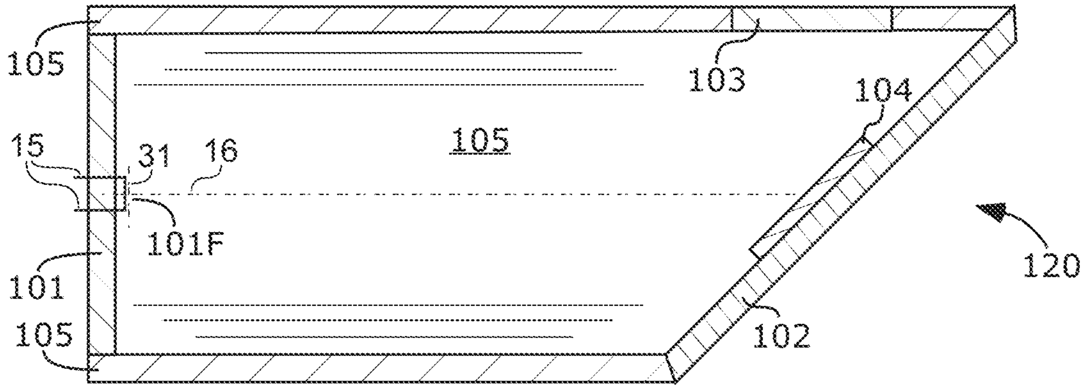
FIG. 12 is a cross-sectional side-view of a side-window, reflection-target x-ray tube 120 with a filament 101F as described herein.

The filaments herein can be planar and spiral. These filaments can include an elongated wire extending non-linearly in a plane 31 (see FIGS. 3-9). Note that the plane of the filaments 10 and 20 in FIGS. 1 and 2 is parallel to the sheet. The plane 31 can be perpendicular to an axis 16 extending between a cathode 101 and a target 104 of an x-ray tube 100, 110 and 120, as shown in FIGS. 10-12.

One benefit of a spiral shape can be avoiding corners of a zig-zag shape. Another benefit can be a central, circular region of electron emission, resulting in a central, circular region of x-ray emission at the target 104 (FIGS. 10-12). This can focus the x-rays to a smaller focal spot.

The filament can include a spiral segment with the elongated wire forming at least one complete revolution about an axis 16 at a center-region 14, on both sides of the axis 16. Thus, the filament can form a double spiral shape oriented parallel to the plane 31.

Figure 6:
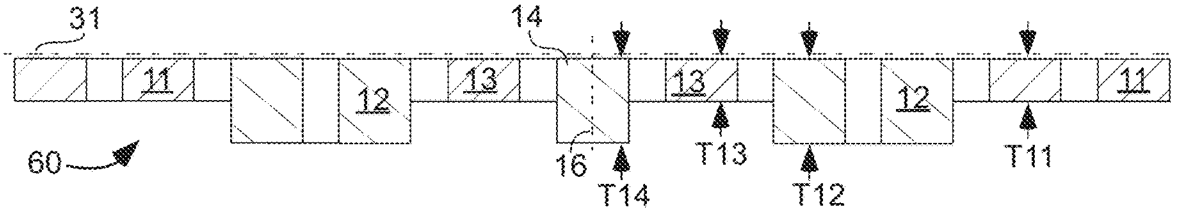

As illustrated in FIGS. 1 and 6, the filament 10 and/or 60 can include a pair of outer-high-regions 11, a pair of low-regions 12, a pair of central-high-regions 13, and a center-region 14. Each low-region 12 can be electrically-coupled to one of the outer-high-regions 11 at one end and to one of the central-high-regions 13 at an opposite end. The center-region 14 can be electrically-coupled between the pair of central-high-regions 13. Thus, the regions can be arranged in the following order along the filament and/or wire: an outer-high-region 11, a low-region 12, a central-high-region 13, the center-region 14, a central-high-region 13, a low-region 12, then an outer-high-region 11.

Figure 5:
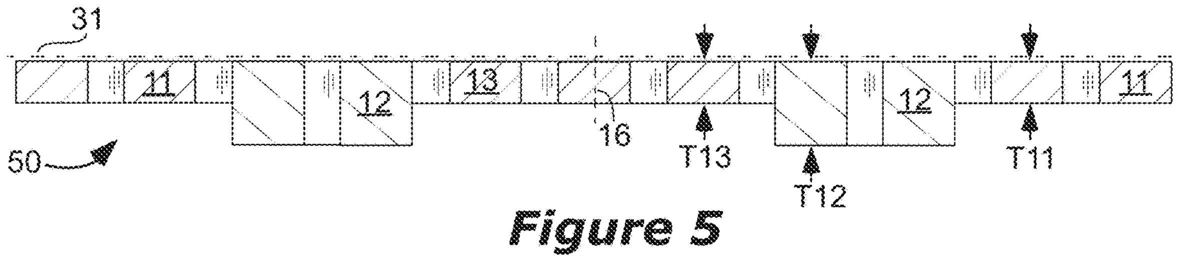

As illustrated in FIGS. 2 and 5, the filament 20 and/or 50 can include a pair of outer-high-regions 11, a pair of low-regions 12, and a central-high-region 13. Each low-region 12 can be electrically-coupled to one of the outer-high-regions 11 at one end and to the central-high-region 13 at an opposite end. Thus, the regions can be arranged in the following order along the filament and/or wire: an outer-high-region 11, a low-region 12, a central-high-region 13, a low-region 12, then an outer-high-region 11.

Figure 3:
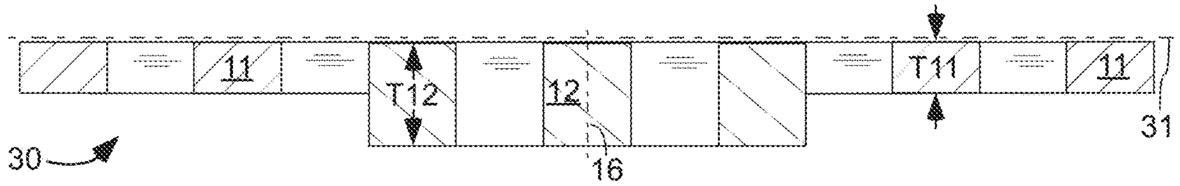
Figure 4:
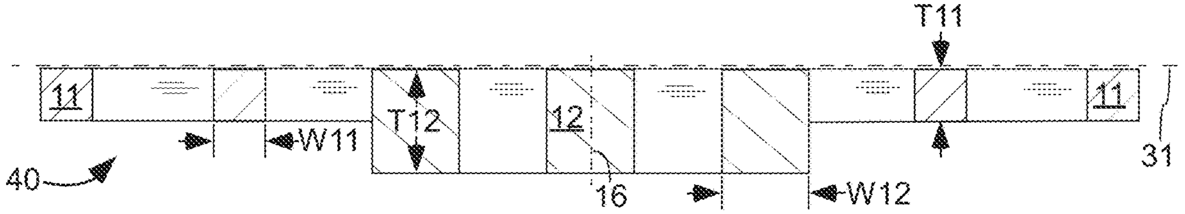

As illustrated in FIGS. 3 and 4, the filament can include a pair of outer-high-regions 11 and a low-region 12. The low-region 12 can be electrically-coupled between the pair of outer-high-regions 11. Thus, the regions can be arranged in the following order: an outer-high-region 11, a low-region 12, then an outer-high-region 11.

For the filaments herein, different regions can have different cross-sectional areas (A12, A11, A13) relative to each other, and thus different current density relative to each other, for shaping of the electron beam and/or strengthening selected regions of the filament. The cross-sectional area (A12, A11, A13) can be the wire width times thickness for a square or rectangular wire.

For example, the low-region 12 can have a wire cross-sectional area A12 that is larger than a wire cross-sectional area A11 of an adjacent outer-high-region 11. Here are example relationships between the cross-sectional area A12 of the wire in the low-region 12 compared to the cross-sectional area A11 of the wire in the outer-high-region 11: A12>A11, A12/A11≥1.05, A12/A11≥1.1, A12/A11≥1.2, A12/A11≥1.5, A12/A11≥2, A12/A11≥3, or A12/A11≥4.

Due to this difference in wire cross-sectional area A12 and A11, the low-region 12 can have lower current density than a current density of the adjacent outer-high-region 11. For example, each low-region 12 can have at least 10% less, at least 15% less, at least 25% less, or at least 50% less current density during operation as in the adjacent outer-high-region 11.

The low-region 12 can have a wire cross-sectional area A12 that is larger than a wire cross-sectional area A13 of an adjacent central-high-region 13. Here are example relationships between the cross-sectional area A12 of the wire in the low-region 12 compared to the cross-sectional area A13 of the wire in the central-high-region 13: A12>A13, A12/A13≥1.05, A12/A13≥1.1, A12/A13≥1.2, A12/A13≥1.5, A12/A13≥2, A12/A13≥3, or A12/A13≥4.

Due to this difference in wire cross-sectional area A12 and A13, the low-region 12 can have lower current density than a current density of the adjacent central-high-region 13. For example, each low-region 12 can have at least 10% less, at least 15% less, at least 25% less, or at least 50% less current density during operation as in the adjacent central-high-region 13. The center-region 14 can have a wire cross-sectional area A14 that is larger than a wire cross-sectional area A13 of adjacent central-high-regions 13. Here are example relationships between the cross-sectional area A14 of the wire in the center-region 14 compared to the cross-sectional area A13 of the wire in the central-high-region 13: A14>A13, A14/A13≥1.05, A14/A13≥1.1, A14/A13≥1.2, A14/A13≥1.5, A14/A13≥2, A14/A13≥3, or A14/A13≥4.

Due to this difference in wire cross-sectional area A14 and A13, the center-region 14 can have lower current density than a current density of the adjacent central-high-regions 13. For example, the center-region 14 can have at least 10% less, at least 15% less, at least 25% less, or at least 50% less current density during operation as in the adjacent central-high-region(s) 13.

Each central-high-region 13 can have ≥1.05 times, ≥1.1 times, ≥1.2 times, ≥1.5 times, ≥2 times, or ≥4 times as much current density during operation as in the low-region 12 and/or in the center-region 14 adjacent to the central-high-region 13.

The above relationships, of different area values of different regions, can be due to different widths, different thicknesses, or both. Different widths are illustrated in FIGS. 1, 2, and 4. Different thicknesses are illustrated in FIGS. 3-6. Different widths and different thicknesses are illustrated in FIG. 4. Different widths and different thicknesses combined, as shown on filament 40, can be included in any of the embodiments described herein.

Here are example relationships between the width W12 of the wire in the low-region 12 compared to the width W11 of the wire in the outer-high-region 11: W12>W11, W12/W11≥1.05, W12/W11≥1.1, W12/W11≥1.2, W12/W11≥1.5, W12/W11≥2, W12/W11≥3, or W12/W11≥4. Here are example relationships between the width W12 of the wire in the low-region 12 compared to the width W13 of the wire in the central-high-region 13: W12>W13, W12/W13≥1.05, W12/W13≥1.1, W12/W13≥1.2, W12/W13≥1.5, W12/W13≥2, W12/W13≥3, or W12/W13≥4. Here are example relationships between the width W14 of the wire in the center-region 14 compared to the width W13 of the wire in the central-high-region 13: W14>W13, W14/W13≥1.05, W14/W13≥1.1, W14/W13≥1.2, W14/W13≥1.5, W14/W13≥2, W14/W13≥3, or W14/W13≥4.

Here are example relationships between the thickness T12 of the wire in the low-region 12 compared to the thickness T11 of the wire in the outer-high-region 11: T12>T11, T12/T11≥1.05, T12/T11≥1.1, T12/T11≥1.2, T12/T11≥1.5, T12/T11≥2, T12/T11≥3, or T12/T11≥4. Here are example relationships between the thickness T12 of the wire in the low-region 12 compared to the thickness T13 of the wire in the central-high-region 13: T12>T13, T12/T13≥1.05, T12/T13≥1.1, T12/T13≥1.2, T12/T13≥1.5, T12/T13≥2, T12/T13≥3, or T12/T13≥4. Here are example relationships between the thickness T14 of the wire in the center-region 14 compared to the thickness T13 of the wire in the central-high-region 13: T14>T13, T14/T13≥1.05, T14/T13≥1.1, T14/T13≥1.2, T14/T13≥1.5, T14/T13≥2, T14/T13≥3, or T14/T13≥4.

Figure 7:
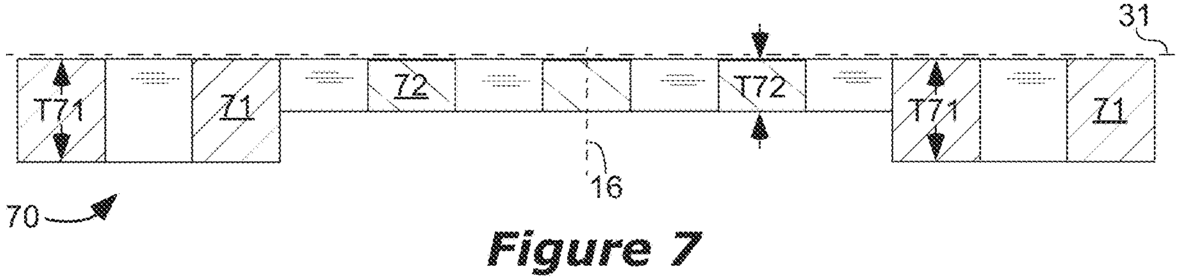
Figure 8:
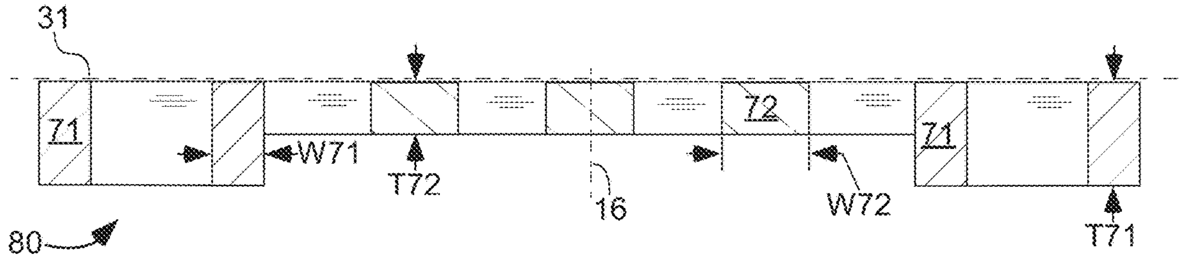

As illustrated in FIGS. 7 and 8, the filament 70 and/or 80 can include a thin-region 72 and a pair of thick-regions 71. The thin-region 72 can be electrically-coupled between the pair of thick-regions 71.

The thin-region 72 can be thinner than the pair of thick-regions 71. This can increase current density in the thin region 72, which can be located at a center of the wire. This increased current density can increase wire temperature in this region of desired electron emission. For example, T71/T72≥1.05, T71/T72≥1.1, T71/T72≥1.2, T71/T72≥1.5, T71/T72≥2, T71/T72≥3, or T71/T72≥4. T71 is a thickness of the wire in the pair of thick-regions 71. T72 is a thickness of the wire in the thin-region 72.

The thin-region 72 can be wider than the pair of thick-regions 71. This can increase area for electron emission. For example, W72/W71≥1.05, W72/W71≥1.1, W72/W71≥1.2, W72/W71≥1.5, W72/W71≥2, W72/W71≥3, or W72/W71≥4. W72 is a width of the wire in the thin-region 72. W71 is a width of the wire in the pair of thick-regions 71.

Junctions between each thick-region 71 and the thin-region 72 can be located in a central 25% of a length of the wire. The thin-region 72 can be located entirely in a central 25% of a length of the wire.

Thus, making the wire thinner (to increase current density) and making the wire wider (to increase area for electron emission) can greatly increase electron emission at a center of the filament. This can result in a small, focused electron spot at the target.

In any filament described herein, to avoid sharp electrical field gradients, there can be a smooth transition of cross-sectional area of the wire between regions.

As illustrated in FIGS. 1 and 2, there can be a smooth transition of width between the outer-high-region 11 and the low-region 12, between the low-region 12 and the central-high-region 13, and between the central-high-region 13 and the center-region 14. This smooth transition of width can apply to any filament herein, which has a difference of widths between adjacent regions. A mask can be adjusted to create this smooth transition if the filament pattern is created by etching.

Figure 9:
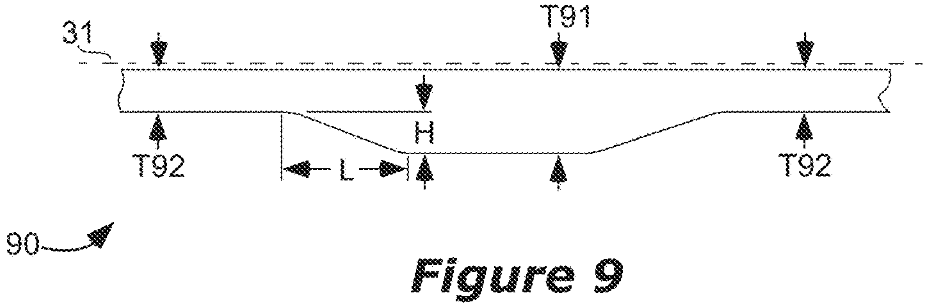
FIG. 9 is a side-view of part of a filament 90, illustrating a smooth transition of thickness between adjacent regions.

As illustrated in FIG. 9, there can be a smooth transition of thickness between adjacent regions (smooth transition between thickness T92 and thickness T91). If the filament is formed by laser cutting, then laser settings can be adjusted to create this smooth transition between different thicknesses. These laser settings include one or more of laser time, power level, and beam size. This smooth transition of thickness can apply to any filament herein, which has a difference of thickness between adjacent regions. Laser settings can be adjusted for the desired thickness and for the smooth transition of thickness between regions.

This smooth transition of width, thickness, or both can be any non-abrupt transition. The transition can be linear, a chamfer, curved, etc. A transition length L can be at least 30% of a transition height H (L≥0.3*H). See FIGS. 1 and 9.

A junction between each low-region 12 and the central-high-region 13 it is adjacent to can be located in a central 25% of a length of the wire. The pair of low-regions 12 can be located in a central 25% of a length of the wire.

The wire can have the same cross-sectional area throughout the outer-high-regions 11. The wire can have the same cross-sectional area throughout the central-high-region 13. Thus, there can be substantially uniform heating throughout each of these regions.

X-ray tubes 100, 110, and 120 are illustrated in FIGS. 10-12, each with a filament 101F as described herein. Each x-ray tube can include a filament 101F with an elongated wire extending non-linearly in a plane 31 between a pair of electrodes 15. The filament 101F can be heated by an electrical current through the elongated wire due to a voltage differential across the pair of electrodes 15.

Each x-ray tube can include a cathode 101 and an anode 102 electrically insulated from one another. An electrically-insulative enclosure 105 can insulate the cathode 101 from the anode 102. The cathode 101 can include the filament 101F. The filament 101F can be configured to emit electrons towards the anode 102. The anode 102 can include a target 104 which is configured to generate x-rays. The x-rays can emit through an x-ray window 103 and out of the x-ray tube in response to the impinging electrons from the filament 101F.

Method

Following are methods of making a spiral filament with multiple, different thicknesses. Steps of the methods can be performed in the order shown. The spiral filament can have properties as described above.

Figure 13:
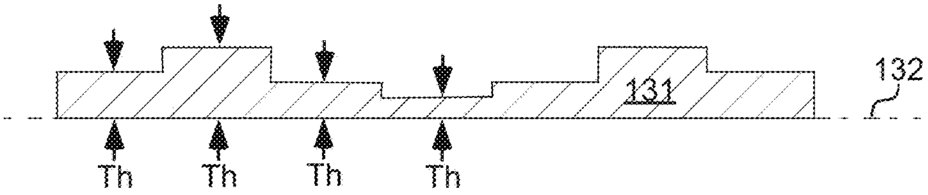
FIG. 13 is a cross-sectional side-view illustrating a step in a method of making a spiral filament, including providing a sheet of metal 131 with multiple, different thicknesses Th.

A method of making a spiral filament with multiple, different thicknesses can include the following steps, which can be performed in the following order:

(a) providing a sheet of metal 131 (FIG. 13) with the multiple, different thicknesses Th, the multiple, different thicknesses Th being measured perpendicular to a plane 132 of a face of the sheet of metal 131; and (b) cutting an elongated shape 151 of the spiral filament in the sheet of metal 131, with a laser 161 (FIG. 16), by etching (FIG. 15), or both, such that different sections of the elongated shape 151 have the multiple, different thicknesses Th.

In the above method, providing the sheet of metal 131 with the multiple, different thicknesses Th can include applying a mask 142 on a planned thicker region of a sheet of metal 131, then etching outside of the mask 142, to form the multiple, different thicknesses Th (see FIG. 14). The mask 142 may then be removed chemically. This step can be repeated, with the mask 142 in different locations, for more than two different thicknesses Th.

In the above method, cutting the elongated shape 151 of the spiral filament can include applying a mask 142 on a planned location of the elongated shape 151, on the sheet of metal 131, then etching outside of the mask 142 to form the elongated shape 151. See FIG. 15. The mask 142 may then be removed chemically before using the spiral filament.

In the above method, cutting the elongated shape can include using a laser 161. This can further comprise tapering laser settings between the different thicknesses to produce smooth transitions of thickness between the different thicknesses. See FIG. 16.

Another method for making a spiral filament with multiple, different thicknesses can include the following steps, which can be performed in the following order:

(a) cutting an elongated shape 151 of the spiral filament in a sheet of metal with a laser 161 (FIG. 16), by etching (FIG. 15), or both; and (b) applying a mask 142 on a planned thicker region of the elongated shape 151 (FIG. 17), then etching outside of the mask 142, to form the multiple, different thicknesses of the elongated shape 151.

The mask 142 may then be removed chemically following step (b). This step (b) can be repeated, with the mask 142 in different locations, for more than two different thicknesses Th.

Another method for making a spiral filament with multiple, different thicknesses can include cutting an elongated shape 151 of the spiral filament in a sheet of metal with a laser 161 and using a different amount of laser cutting, in different regions with respect to each other, to form the multiple, different thicknesses. The method can further comprise tapering laser settings between the different regions to produce smooth transitions of thickness between the different regions.

What is claimed is:

1. An x-ray tube comprising:

a cathode and an anode electrically insulated from one another, the cathode including a filament configured to emit electrons towards the anode, and the anode configured to emit x-rays out of the x-ray tube in response to impinging electrons from the filament;

the filament comprises an elongated wire in a plane extending non-linearly in between a pair of electrodes, the filament capable of being heated by an electrical current through the elongated wire due to a voltage differential across the pair of electrodes;

the filament includes a low-region and a pair of outer-high-regions;

the low-region is electrically-coupled between the pair of outer-high-regions;

the low-region is configured to have lower current density during operation than the pair of outer-high-regions due to a larger thickness in the low-region than a thickness in the pair of outer-high-regions; and wherein the filament has a planar face and the larger thickness in the low-region extends perpendicular from the planar face.

2. The x-ray tube of claim 1, wherein each outer-high-region has ≥1.1 times as much current density during operation as in the low-region.

3. The x-ray tube of claim 1, wherein a width of the wire in the low-region is larger than a width of the wire in the outer-high-regions.

4. The x-ray tube of claim 1, wherein W12/W11≥1.1, where W12 is a width of the wire in the low-region and W11 is a width of the wire in the outer-high-regions.

5. The x-ray tube of claim 1, wherein the low-region is located in a central 25% of a length of the wire.

6. The x-ray tube of claim 1, further comprising a smooth transition of thickness between each of the outer-high-regions and the low-region.

7. The x-ray tube of claim 1, wherein a center of the filament is wider and thinner than any other part of the filament.

8. The x-ray tube of claim 1, further comprising:
the low-region includes a pair of low-regions;
the filament includes a central-high-region;
each low-region is electrically-coupled to one of the outer-high-regions at one end and to the central-high-region at an opposite end; and
a smooth transition of cross-sectional area of the wire between each low-region and the outer-high-region adjacent to it and between each low-region and the central-high-region.

9. The x-ray tube of claim 8, wherein:
the central-high-region includes a pair of central-high-regions;
the wire further comprises a center-region, the center-region is electrically-coupled between the pair of central-high-regions; and
the center-region is configured to have lower current density during operation, due to a larger cross-sectional area of the wire in the center-region, than the pair of central-high-regions.

10. The x-ray tube of claim 9, wherein $AL/AHc \geq 1.1$ and $Ac/AHc \geq 1.1$, where AL is the cross-sectional area of the wire of each low-region, AHc is the cross-sectional area of the wire of the central-high-region adjacent to the low-region, and Ac is the cross-sectional area of the wire of the center-region.

11. The x-ray tube of claim 9, wherein a width of the wire in each low-region is larger than a width of the wire in the central-high-region adjacent to it, and a width of the wire in the center-region is larger than a width of the wire in the pair of central-high-regions.

12. The x-ray tube of claim 9, wherein $W12/W13 \geq 1.1$ and $W14/W13 \geq 1.1$, where W12 is a width of the wire in each low-region, W13 is a width of the wire in the central-high-region adjacent to the low-region, and W14 is a maximum width of the wire in the center-region.

13. The x-ray tube of claim 9, further comprising a smooth transition of cross-sectional area of the wire between each central-high-region and the low-region adjacent to it and between each central-high-region and the center-region.

14. The x-ray tube of claim 1, further comprising:
the low-region includes a pair of low-regions;
the filament includes a central-high-region;
each low-region is electrically-coupled to one of the outer-high-regions at one end and to the central-high-region at an opposite end; and
the wire has the same cross-sectional area throughout the outer-high-regions and the same cross-sectional area throughout the central-high-region.

15. The x-ray tube of claim 14, wherein:
the central-high-region includes a pair of central-high-regions;
the wire further comprises a center-region, the center-region is electrically-coupled between the pair of central-high-regions; and
the center-region is configured to have lower current density during operation, due to a larger cross-sectional area of the wire in the center-region, than the pair of central-high-regions.

16. The x-ray tube of claim 15, wherein $AL/AHc \geq 1.1$ and $Ac/AHc \geq 1.1$, where AL is the cross-sectional area of the wire of each low-region, AHc is the cross-sectional area of the wire of the central-high-region adjacent to the low-region, and Ac is the cross-sectional area of the wire of the center-region.

17. The x-ray tube of claim 15, wherein a width of the wire in each low-region is larger than a width of the wire in the central-high-region adjacent to it, and a width of the wire in the center-region is larger than a width of the wire in the pair of central-high-regions.

18. The x-ray tube of claim 15, wherein $T12/T11 \geq 1.1$, $T12/THc \geq 1.1$, $Tc/T11 \geq 1.1$, $Tc/THc \geq 1.1$, where T12 is a maximum thickness of the wire in each low-region, T11 is a minimum thickness of the wire in the outer-high-region attached to the low-region, THc is a minimum thickness of the wire in the central-high-regions attached to the low-region, and Tc is a maximum thickness of the wire in the center-region.

19. The x-ray tube of claim 1, wherein $T12/T11 \geq 1.1$, where T12 is a maximum thickness of the wire in the low-region, and T11 is a minimum thickness of the wire in the outer-high-regions.

20. The x-ray tube of claim 1, wherein 90% of electrons are emitted from a central 25% of the filament.

* * * * *